(12) United States Patent
Oh et al.

(10) Patent No.: US 10,151,013 B2
(45) Date of Patent: Dec. 11, 2018

(54) HOT PRESS FORMING PARTS HAVING EXCELLENT BENDING PROPERTIES AND METHOD FOR MANUFACTURING THE SAME

(71) Applicant: POSCO, Pohang-si (KR)

(72) Inventors: Jin-Keun Oh, Gwangyang-si (KR); Yeol-Rae Cho, Gwangyang-si (KR); Seong-Woo Kim, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 15/250,079

(22) Filed: Aug. 29, 2016

(65) Prior Publication Data

US 2016/0362763 A1    Dec. 15, 2016

Related U.S. Application Data

(63) Continuation of application No. PCT/KR2015/004328, filed on Apr. 29, 2015.

(30) Foreign Application Priority Data

Dec. 24, 2014    (KR) .................. 10-2014-0189097

(51) Int. Cl.

| | | |
|---|---|---|
| *C21D 9/46* | (2006.01) | |
| *C23C 2/12* | (2006.01) | |
| *C22C 38/28* | (2006.01) | |
| *B32B 15/01* | (2006.01) | |
| *C21D 8/02* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/32* | (2006.01) | |
| *C23C 2/28* | (2006.01) | |
| *C23C 2/40* | (2006.01) | |
| *C22C 21/02* | (2006.01) | |

(52) U.S. Cl.
CPC .............. *C21D 9/46* (2013.01); *B32B 15/012* (2013.01); *C21D 8/0226* (2013.01); *C21D 8/0236* (2013.01); *C21D 8/0247* (2013.01); *C21D 8/0284* (2013.01); *C22C 21/02* (2013.01); *C22C 38/001* (2013.01); *C22C 38/002* (2013.01); *C22C 38/02* (2013.01); *C22C 38/04* (2013.01); *C22C 38/06* (2013.01); *C22C 38/28* (2013.01); *C22C 38/32* (2013.01); *C23C 2/12* (2013.01); *C23C 2/28* (2013.01); *C23C 2/40* (2013.01); *C21D 2211/004* (2013.01); *C21D 2211/005* (2013.01)

(58) Field of Classification Search
CPC ...... C21D 9/46; C21D 8/0226; C21D 8/0236; C21D 8/0247; C23C 2/12; C23C 2/40; C22C 38/22; C22C 38/28; C22C 38/06; C22C 38/04; C22C 38/02; C22C 38/002

See application file for complete search history.

(56) References Cited

U.S. PATENT DOCUMENTS

| | | | |
|---|---|---|---|
| 4,456,663 A | * | 6/1984 | Leonard .................. C23C 2/12 427/399 |
| 6,296,805 B1 | | 10/2001 | Laurent et al. |
| 2005/0199322 A1 | | 9/2005 | Nakamura et al. |
| 2009/0238715 A1 | | 9/2009 | Cho et al. |
| 2014/0030544 A1 | | 1/2014 | Maki et al. |
| 2014/0044987 A1 | | 2/2014 | Tanahashi et al. |
| 2015/0314568 A1 | | 11/2015 | Takahashi et al. |

FOREIGN PATENT DOCUMENTS

| | | |
|---|---|---|
| CA | 2879069 | 2/2014 |
| CN | 1667151 | 9/2005 |
| CN | 101545071 | 9/2009 |
| EP | 2730666 | 5/2014 |
| EP | 2733228 | 5/2014 |
| EP | 2762583 | 8/2014 |
| JP | 2000038640 | 2/2000 |
| JP | 2005097725 | 4/2005 |
| JP | 2006037130 | 2/2006 |

(Continued)

OTHER PUBLICATIONS

ASM International, Materials Park, Ohio, Handbook of Residual Stress and Deformation of Steel, "Effect of Residual Stress of Hydrogen Embrittlement and Stress Corrosion Cracking", pp. 70-85, Mar. 2002.*

(Continued)

*Primary Examiner* — Jessee R Roe
(74) *Attorney, Agent, or Firm* — Cantor Colburn LLP

(57) ABSTRACT

Provided is an HPF member having excellent bending characteristics and a hot-dip aluminum plated layer formed on a surface of a base steel sheet. The base steel sheet includes, in terms of wt %, 0.18-0.25% of C, 0.1-0.5% of Si, 0.9-1.5% of Mn, 0.03% or less of P, 0.01% or less of S, 0.01-0.05% of Al, 0.05-0.5% of Cr, 0.01-0.05% of Ti, 0.001-0.005% of B, 0.009% or less of N, the balance Fe and other impurities; a ferrite phase having a thickness within 50 μm is continuously or discontinuously formed inside a surface portion of the base steel sheet; the fraction of the surface portion occupied by the ferrite phase is 5% or less; and carbide materials having a size of 1 μm or less are scattered and distributed in the surface portion of the base steel sheet so as to occupy 90% or more of the overall carbide distribution.

7 Claims, 4 Drawing Sheets

(56) References Cited

FOREIGN PATENT DOCUMENTS

| | | |
|---|---|---|
| JP | 2010018860 | 1/2010 |
| JP | 2011099149 | 5/2011 |
| JP | 2014037596 | 2/2014 |
| KR | 1020070057689 | 6/2007 |
| KR | 1020070087240 | 8/2007 |
| KR | 1020130132623 | 12/2013 |
| WO | 02103073 | 12/2002 |
| WO | 2012137687 | 10/2012 |
| WO | 2012147863 | 11/2012 |
| WO | 2014024825 | 2/2014 |

OTHER PUBLICATIONS

Chinese Office Action—Chinese Application No. 201580010489.3 dated May 18, 2017, citing CN101545071 and CN1667151.
International Search Report—PCT/KR2015/004328 dated Sep. 8, 2015.
European Search Report—European Application No. 15873409.5, dated Dec. 22, 2017, citing CA 2 879 069, EP 2 730 666, EP 2 733 228, and EP 2 762 583.

* cited by examiner

HOT PRESS FORMING PARTS HAVING EXCELLENT BENDING PROPERTIES AND METHOD FOR MANUFACTURING THE SAME

CROSS-REFERENCE TO RELATED APPLICATION

This application is a continuation of PCT Patent Application No. PCT/KR2015/004328 filed on Apr. 29, 2015, which claims priority to and the benefit of Korean Patent Application No. 10-2014-0189097 filed on Dec. 24, 2014, and the entire disclosures of which are incorporated herein by reference.

TECHNICAL FIELD

The present invention relates to a hot press forming (HPF) part used as a structural part of a vehicle or the like, requiring impact resistance characteristics, and more particularly, to a ultra-strong HPF part having a tensile strength of 1300 MPa or greater and a method for manufacturing the same by heating a steel material to a temperature at which an austenite single phase may be formed, and quenching and hot forming thereof using a mold.

BACKGROUND ART

Recently, in the global automobile industry, the development of steels having excellent impact resistance and the application thereof have been in strong demand for weight reductions of a vehicle bodies in addition to passenger protection. In order to secure the above properties, research into ultra-strong steels having a tensile strength of 1300 MPa or greater has been actively undertaken, but it has been difficult to form automobile parts having complicated shapes therefrom, due to a lack of formability through having ultra-high strength and also to secure shape precision due to spring-back.

In order to solve the above problems, the Hot Press Forming (HPF) method has been suggested (for example, a technique suggested in U.S. Pat. No. 6,296,805 and the like). The technique presented in the above patent is a method for manufacturing an HPF part having ultra-high strength by heating a hot dip aluminum plated steel sheet, having thermal resistance at a high temperature, to a high temperature, forming a part by hot press forming, and then quenching the part to secure martensite throughout the entire part. However, the HPF part manufactured by the above technique is composed of martensite as a main phase in the entire thickness of the HPF part in a percentage of 100% to secure ultra-high strength. Sometimes, in the case that a cooling speed of a part in a mold is slow or the formed part is a thin plate (1 mm or less), ferrite and/or bainite may be formed at the martensite grain boundaries, but these microstructures cause a reduction of strength and bending properties of the HPF part. Accordingly, these microstructures are considered to be unintended microstructures.

Further, bending properties are considered as a representative index for evaluating impact resistance characteristics of the HPF part. For example, like a car B-pillar, fracture toughness, a measurement of steel properties determined by measuring a degree to which a car part can endure deformation without fracturing to a certain degree (angle) after the HPF part is bent by car side impact (bending properties), is required. However, it is known that the bending properties of HPF parts containing martensite and/or grain boundary ferrite throughout the entire thickness of the part may be degraded due to the presence of martensite, which degrades the ultra-high strength of the part itself and the bending properties structurally. When forming an HPF part to have a bainite microstructure in order to improve the bending properties, there is a problem that it is difficult to secure the ultra-high strength.

Thus, the present inventors have developed a method for securing impact resistance characteristic of the HPF part by improving bending properties thereof, as well as securing ultra-high strength therein.

SUMMARY OF THE INVENTION

An aspect of the present invention is directed to providing an ultra-strong HPF part having excellent bending properties and a tensile strength of 1300 MPa or greater, used in the structural parts of vehicles and the like requiring an impact resistance characteristics.

Further, the present invention is directed to providing a method for manufacturing the HPF part.

However, problems sought to be resolved by the present disclosure are not limited to the above-described problems. Other problems, which are sought to be resolved by the present disclosure but are not described herein, will be clearly understood by those skilled in the art from the descriptions below.

The present invention relates to an HPF part wherein a hot dip aluminum plating layer is formed on the surface of a base steel sheet, an HPF part having excellent bending properties, wherein the base steel sheet comprises C: 0.18% to 0.25%, Si: 0.1% to 0.5%, Mn: 0.9% to 1.5%, P: 0.03% or less, S: 0.01% or less, Al: 0.01% to 0.05%, Cr: 0.05% to 0.5%, Ti: 0.01% to 0.05%, B: 0.001% to 0.005%, N: 0.009% or less, a balance of Fe and other impurities by wt %;

a ferrite phase is continuously or discontinuously formed on the surface of the base steel sheet to a thickness of 50 μm or thinner, and a percentage of a ferrite phase in the surface is 5% or less; and carbide particles having a size of 1 μm or smaller are dispersively distributed in the surface of the base steel sheet so as to occupy 90% or greater in overall carbide particle distribution.

In the present invention, an amount of the carbide particles in a size range of 1 μm to 10 μm may be 5 or less per 10 mm$^2$ in the surface.

Further, the base steel sheet may be any one of a cold rolled steel sheet and a hot rolled steel sheet. The base steel sheet may preferably further comprise Mo+W within a range of 0.001% to 0.5%.

Further, the base steel sheet may preferably further comprise at least one of Nb, Zr and V within a range of 0.001% to 0.4% (as the sum).

Further, the base steel sheet may preferably further comprise Cu+Ni: within a range of 0.005% to 2.0%.

Moreover, the base steel sheet may preferably further comprise at least one of Sb, Sn and Bi in an amount of 0.03% or less.

Further, the present invention relates to a method for manufacturing an HPF part having excellent bending properties, which comprises:

a process of manufacturing a hot rolled steel sheet having a composition as described above;

a process of coiling the hot rolled steel sheet at a temperature within a range of 450° C. to 750° C. for a time satisfying Relational Expression 1;

a process of cold rolling, annealing and then conducting hot dip aluminum plating on the annealed steel sheet;

a process of heating the hot dip aluminum plated steel sheet to a temperature of 850° C. to 1000° C. and then maintaining the hot dip aluminum plated steel sheet at the temperature for a certain period of time; and a process of hot forming the heated steel material and cooling thereof at a temperature within a range of 200° C. or lower at a cooling speed of 20° C./s to 1000° C./s at the same time to manufacture an HPF part to manufacture an HPF part.

$$190{,}000 \leq [\text{coiling temperature (CT)} \times \text{Time (min)}]/2 \leq 350{,}000 \quad \text{[Relational Expression 1]}$$

in the Relational Expression 1, Time refers to a time taken to reach 200° C. from coiling temperature.

Further, in the present invention, the steel material may preferably be maintained for a time of 1 second to 1000 seconds after the heating process.

Further, the annealing temperature may be preferably managed at a temperature within a range of 700° C. to 900° C.

Further, a cold reduction ratio during the cold rolling may preferably be in a range of 30% to 80%.

Further, in the HPF part, a ferrite phase may preferably be continuously or discontinuously formed on the surface of the base steel sheet to a thickness of 50 μm or thinner, and a percentage of a ferrite phase in the surface may preferably be 5% or less; and carbide particles having a size of 1 μm or smaller may preferably be dispersively distributed in the surface of the base steel sheet so as to occupy 90% or greater in a whole carbide particle distribution.

Further, an amount of the carbide particles in a size range of 1 μm to 10 μm may preferably be 5 or less per 10 mm$^2$ in the surface.

Further, the present invention relates to a method for manufacturing a cold rolled steel sheet comprising:

a process of manufacturing a hot rolled steel sheet having a composition as described above;

a process of coiling the manufactured hot rolled steel sheet at a temperature within a range of 450° C. to 750° C. for a time satisfying Relational Expression 1; and a process of cold rolling the coiled hot rolled steel sheet.

$$190{,}000 \leq [\text{coiling temperature (CT)} \times \text{Time (min)}]/2 \leq 350{,}000 \quad \text{[Relational Expression 1]}$$

where Time refers to a time taken to reach 200° C. from coiling temperature

Further, a cold reduction ratio during the cold rolling may preferably be in a range of 30% to 80%.

Further, the present invention relates to a method for manufacturing an HPF part having excellent bending properties comprising:

a process of annealing the manufactured cold rolled steel sheet, and then conducting hot dip aluminum plating;

a process of heating the hot dip aluminum plated steel sheet to a temperature of 850° C. to 1000° C. and then maintaining the hot dip aluminum plated steel sheet at the temperature for a certain period of time; and a process of hot forming the heated steel material and cooling thereof at a temperature within a range of 200° C. or lower at a cooling speed of 20° C./s to 1000° C./s at the same time to manufacture an HPF part.

Further, in the present invention, the steel material may preferably be maintained for a time of 1 second to 1000 seconds after the heating process.

Further, the annealing temperature may preferably be managed at a temperature within a range of 700° C. to 900° C.

Further, in the HPF part, a ferrite phase may preferably be continuously or discontinuously formed on the surface of the base steel sheet to a thickness of 50 μm or thinner, and a percentage of a ferrite phase in the surface may preferably be 5% or less; and carbide particles having a size of 1 μm or smaller may preferably be dispersively distributed in the surface of the base steel sheet so as to occupy 90% or greater in a whole carbide particle distribution.

Further, an amount of the carbide particles in a size range of 1 μm to 10 μm may preferably be 5 or less per 10 mm$^2$ in the surface.

The present invention has an effect of providing an ultra-strong HPF part having excellent bending properties and tensile strength of 1300 MPa or greater, thereby effectively used to structural parts of vehicles and the like requiring an impact resistance characteristic.

DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE INVENTION

Figure 1:
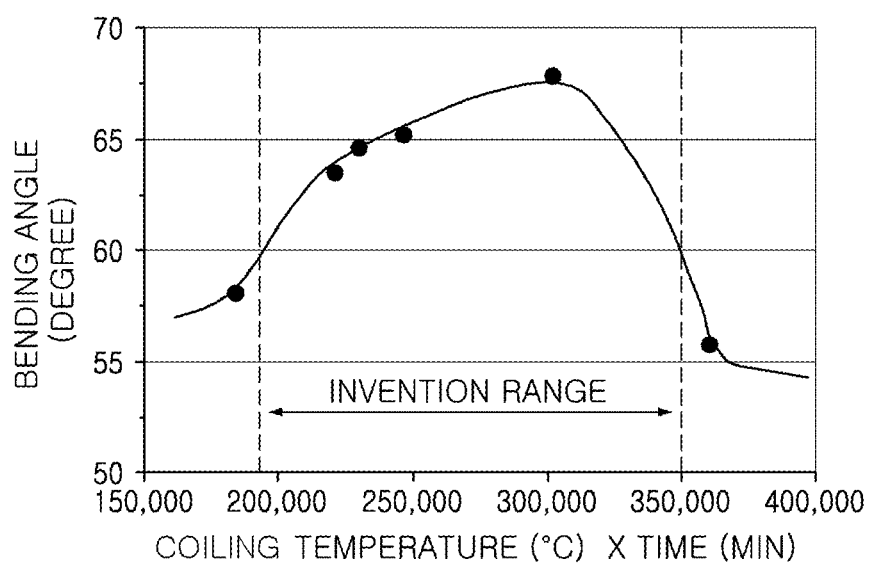
FIG. 1 is a graph showing correlation between coiling temperature×Time and bending angle according to an embodiment of the present invention.

Hereinafter, the present invention will be described.

The present inventors repeated studies and experiments about a method for providing bending properties to an HPF part in manufacturing the HPF part having ultra-high strength of tensile strength of 1300 MPa or greater. As a result, the inventors found that ultra-high strength can be secured and also bending properties can be remarkably improved by controlling a microstructure of the surface of the HPF part and also controlling size and a percentage of carbide particles in the surface at the same time.

In detail, the present inventors found that there are problems in that a microstructure of the surface of a general HPF part is composed of martensite without ferrite, and bending properties of the formed part may be remarkably reduced because the carbide particles remaining inside the martensite are not precisely controlled. In particular, in the case of a hot dip aluminum plated steel sheet, cracks are easily formed in the plating layer by an intermetallic compound phase having undesired softness, which is formed during heat treatment for hot forming. Accordingly, crack propagation from this to a martensite base is easy and the coarse carbide particles remained in the base functions as a starting point of crack growth. Thus, it was found that bending properties is remarkably reduced.

Considering this, the present inventors found that forming ferrite continuously or discontinuously on the surface of the base steel sheet directly under the plating layer of the HPF part is very effective to inhibit the propagation of the fine cracks formed on the plating layer to the base. Moreover, the present inventors suggest the present invention after confirmed that size and a percentage of the carbide particles in the surface is very important to inhibit growth speed of the small amount of the fine cracks already propagated to the base.

First of all, the HPF part of the present invention having excellent bending properties will be described.

In the present invention, in an HPF part wherein a hot dip aluminum plating layer is formed on the surface of a base steel sheet, the base steel sheet comprises C: 0.18% to 0.25%, Si: 0.1% to 0.5%, Mn: 0.9% to 1.5%, P: 0.03% or less, S: 0.01% or less, Al: 0.01% to 0.05%, Cr: 0.05% to 0.5%, Ti: 0.01% to 0.05%, B: 0.001% to 0.005%, N: 0.009% or less, a balance of Fe and other impurities by wt %.

Hereinafter, each ingredient of the base steel sheet and reasons for limiting thereof will be described in detail.

C: 0.18% to 0.25%

C is an essential element increasing the strength of martensite. If a C content is less than 0.18%, it may be difficult to obtain sufficient strength to secure impact resistance. Further, if a C content is greater than 0.25%, impact toughness of a slab may be deteriorated, and weldability of the HPF part may be deteriorated. In this regard, in the present invention, it is preferable to limit the C content to 0.18 wt % to 0.25 wt % (hereinafter, just called %).

Si: 0.1% to 0.5%

Si is added as a deoxidizing agent in steel making. If Si content is less than 0.1%, enough deoxidizing may be difficult, and if the Si content is greater than 0.5%, it may be difficult to secure good quality of the hot dip aluminum plated surface by Si oxides formed on the surface of the steel sheet. Therefore, in the present invention, it is preferable to limit the Si content to a range of 0.1% to 0.5%.

Mn: 0.9% to 1.5%

Mn is added to secure hardenability of steel such as Cr, B and the like. If Mn content is less than 0.9%, it may be difficult to secure enough hardenability thereby forming bainite. Therefore, it may be difficult to secure sufficient strength. Further, if the Mn content is greater than 1.5%, a cost of manufacturing a steel sheet may increase, and also bending properties of the HPF part may be remarkably deteriorated as the Mn is segregated inside the steel material. In this regard, in the present invention, it is preferably to limit the Mn content within a range of 0.9% to 1.5%.

P: 0.03% or less (not including 0%)

P is a grain boundary segregation element hindering many characteristics of the HPF part. Thus, it is preferable to contain P in as small an amount as possible. If a P content is greater than 0.03%, bending properties, impact resistance properties, weldability and the like of the formed part may be deteriorated. Thus, it is preferable to limit the upper limit of the content to 0.03%.

S: 0.01% or less (not including 0%)

S is an element existing in a steel as an impurity and hindering a bending properties and weldability of the formed part. Thus, it is preferable to contain the S in as small an amount as possible. If S content is greater than 0.01%, the bending properties and weldability of the formed part may be deteriorated. Thus, it is preferable to limit the upper limit of the content to 0.01%.

Al: 0.01% to 0.05%

Al is added for the purpose of deoxidation for steel making like the Si. In order to achieve the purpose, the Al is added in an amount of 0.01% or greater. If the content is greater than 0.05%, the effect may be saturated, and the surface qualities of the plated material may be deteriorated. Thus, it is preferable to limit the upper limit of the content to 0.05%.

Cr: 0.05% to 0.5%

Cr is added to secure hardenability of steel such as Mn, B and the like. If a Cr content is less than 0.05%, it may be difficult to secure enough hardenability, and if the content is greater than 0.5%, sufficient hardenability can be secured. However, the effect may be saturated and also a cost of manufacturing the steel may increase. In this regard, in the present invention, it is preferable to limit the Cr content to a range of 0.05% to 0.5%.

Ti: 0.01% to 0.05%

Ti is added to form TiN by binding to nitrogen remained in steel as an impurity, thereby leaving solid B essential to secure hardenability. If Ti content is less than 0.01%, it may be difficult to expect a sufficient effect, and if the content is greater than 0.05%, the characteristic may be saturated and also a cost of manufacturing steel may increase. In this regard, in the present invention, it is preferable to limit the Ti content to a range of 0.01% to 0.05%.

B: 0.001% to 0.005%

B is added to secure hardenability of the HPF part like Mn and Cr. To achieve this purpose, B should be added in an amount of 0.001% or greater, and if the content is greater than 0.005%, the effect may be saturated, and also hot rolling properties may be remarkably reduced. Thus, in the present invention, it is preferable to limit the B content to a range of 0.001% to 0.005%.

N: 0.009% or less

N exists in steel as an impurity, and it is preferably to add the N in as small an amount as possible. If an N content is greater than 0.009%, it may cause bad surface qualities of steel. Thus, it is preferable to limit the upper limit of the content to 0.009%. Then, more preferably, the base steel sheet making the HPF part of the present invention may further contain the following ingredients.

Mo+W: 0.001% to 0.5%

Mo and W are elements reinforcing hardenability and precipitation, and are very effective in further securing high strength. If the sum of the amounts of the Mo and the W is less than 0.001%, it may be difficult to obtain a sufficient effect of reinforcing hardenability and precipitation, and if the content is greater than 0.5%, the effect may be saturated and manufacturing costs may also increase. Thus, in the present invention, it is preferable to limit the Mo+W content to a range of 0.001% to 0.5%.

Sum of at least one of Nb, Zr or V: 0.001% to 0.4%

Nb, Zr and V are elements increasing strength of a steel sheet, and improving grain refinement and heat treatment characteristics. If a content of at least one of Nb, Zr and V is less than 0.001%, it may be difficult to expect the above effect, and if the content is greater than 0.4%, manufacturing costs may increase excessively. Thus, in the present invention, it is preferable to limit the contents of the elements to a range of 0.001% to 0.4%.

Cu+Ni: 0.005% to 2.0%

The Cu is an element improving strength by forming fine Cu precipitates, and the Ni is an element effective to increase strength and improve heat treatment characteristics. If the sum of the above ingredients is less than 0.005%, it may difficult to obtain enough desired strength, and if the content is greater than 2.0%, workability may become worse, and manufacturing costs may increase. In this regard, in the present invention, it is preferable to control the Cu+Ni content to a range of 0.005% to 2.0%.

At least one of Sb, Sn or Bi: 0.03% or less

The Sb, Sn and Bi are grain segregation elements and during the HPF process, the elements are concentrated on the interface between the plating layer and the base iron and can improve adhesion of the plating layer. The elements can play a role in preventing the detachment of the plating layer during hot forming by improving adhesion of the plating layer. Because the Sb, Sn and Bi have similar characteristics, it is possible to use the three elements as a mixture, and in such a case, the amount of at least one may preferably be 0.03% or less. If the sum of the above ingredients is greater than 0.03%, there may be a problem that brittleness of the base iron may be deteriorated during the hot forming.

Hereinafter, a microstructure of the formed part of the present invention hot formed using the hot dip aluminum plating steel material will be described.

First of all, the present invention is characterized in that a ferrite phase is continuously or discontinuously formed to a thickness of 50 μm or less under a plating layer of the HPF part having the hot dip aluminum plating layer, on the surface directly below the base steel sheet interface. Herein, the surface means a region in depth of 50 μm from the base steel sheet interface to the inside thereof.

In the present invention, the ferrite is a very important phase in the surface of the base steel sheet, and the ferrite should be continuously or discontinuously formed to a thickness of 50 μm or less. If the ferrite is not continuously or is discontinuously formed, cracks formed on the alloyed aluminum plating layer may penetrate into the base steel sheet composed of martensite thereby deteriorating bending properties of the formed part. Thus, the surface ferrite should be continuously or discontinuously formed within the observed thickness of 50 μm or less.

And in the present invention, it is required that area percentage of the ferrite phase on the surface is 5% or less of the entire structure of the surface. If the area percentage is greater than 5%, an excessive increase of a hot rolled coiling temperature may occur, leading to the formation of surface ferrite. Consequently, if the surface layer is decarbonized, Si and/or Mn oxide may be formed in the ferrite grain boundary of the surface layer thereby reducing bending properties of the manufactured HPF part. Moreover, if the surface layer is excessively decarbonized, strength of the manufactured HPF part may be reduced. Thus, in the present invention, it is preferable to limit the area percentage of the ferrite on the surface to 5% or less.

On the other hand, the present invention is characterized by controlling size and distribution of carbide particles existing in the surface in order to manufacture an HPF part having excellent bending properties. Specifically, the present invention is characterized by controlling that carbide particles having a size of 1 μm or smaller are dispersively distributed in the surface of the base steel sheet so as to occupy 90% or greater in overall carbide particle distribution. Although cracks propagated from the plating layer to the base steel sheet by the ferrite formed on the surface as mentioned above becomes slower, there is a limit to which cracks can be easily propagated to the inside of the base steel sheet along the boundary between martensite and the coarse carbide particle. Considering this, the present invention allows the carbide particles having a size of 1 μm or smaller to be dispersively distributed so as to occupy 90% or greater in overall carbide particle distribution for inhibiting crack propagation to the inside of the base steel sheet as mentioned above. The carbide particles, finely dispersively distributed as described above, are almost unaffected by crack propagation as mentioned above. Thus, the carbide particles can effectively inhibit crack propagation to the inside of the base steel sheet thereby improving bending properties of the formed part.

More preferably, an amount of the carbide particles in a size range of 1 μm to 10 μm is controlled to be 5 or less per 10 mm$^2$ in the surface. This control of the number of coarse carbide particles can block a pathway of crack propagation thereby reducing the bending properties of the HPF part.

Hereinafter, a method for manufacturing an HPF part having excellent bending properties of the present invention will be described. First of all, in the present invention, a hot rolled steel sheet having the alloy composition as described above is manufactured. This process of manufacturing a hot rolled steel sheet may be a common process, but is not limited to particular manufacturing conditions. For example, the hot rolled steel sheet can be manufactured by reheating the steel slab composed of the alloy composed as described above at 1000° C. to 1300° C., and then subjecting the steel slab to finishing hot rolling at a temperature within a range of an Ar3 transformation point to 1000° C.

Then, in the present invention, the hot rolled steel sheet manufactured as described above is coiled at a temperature within a range of 450° C. to 750° C. for a time satisfying Relational Expression 1.

At this time, in the present invention, the coiling temperature is a technical configuration playing an important role in obtaining a microstructure and carbide particle distribution of the surface of the manufactured HPF part. If the coiling temperature is lower than 450° C., a sufficient amount of ferrite cannot be formed on the base steel sheet directly below the plating layer and the base steel sheet interface after HPF heating. The reason for this is that a small amount of elements such as C, Mn, Cr and the like existing on the steel sheet surface are released from the surface during coiling. In detail, the reason is presumed to be that in the HPF heating process, the ferrite is mostly formed when transferring the steel sheet to a mold after austenite heating, and when the ferrite forming elements such as C, Mn, Cr and the like are present in a sufficient amount in the steel sheet surface, the ferrite is not formed on the surface, but when the elements are not enough, the ferrite is formed on the surface layer. Thus, if a content of C, Mn and Cr of the surface of the steel sheet is insufficient in the coiling process due to decarbonizing and the like, in the subsequent HPF heating process, the ferrite may be formed on the surface. Moreover, the ferrite also can be obtained by increasing the cooling speed of the surface of the steel sheet in the HPF heating process faster than that of the middle part.

On the other hand, if the coiling temperature is higher than 750° C., the elements are sufficiently released out the surface layer thereby forming enough ferrite after the HPF heating, but at the same time, oxides can be formed on the grain boundary by binding of Si and/or Mn existing in the steel to oxygen in the air and also many coarse carbide particles are formed directly under the surface layer. Therefore, the carbide particles existing even after the HPF heating work as crack initiation points and a pathway of crack propagation during a bending test, thereby deteriorating bending properties. Thus, in order to obtain a certain desired structure and carbide particle distribution after HPF heating, the coiling temperature may preferably be 450° C. to 750° C.

In the present invention, it is preferable to manage the coiling time to satisfy Relational Expression 1, and the time satisfies Relational Expression 1, the effect of limiting the coiling temperature described above may be maximized. This coiling time may be easily controlled by inserting the coiled hot rolled sheet into a slow cooling furnace or a heating furnace. As shown in FIG. 1, it can be found that excellent bending angle can be shown within a range of satisfying Relational Expression 1.

$$190{,}000 \leq [\text{coiling temperature (CT)} \times \text{Time (min)}]/2 \leq 350{,}000 \quad \text{[Relational Expression 1]}$$

in the Relational Expression 1, Time refers to a time taken to reach 200° C. from coiling temperature.

Then, in the present invention, the hot rolled steel sheet is pickled, immediately hot dip aluminum plated without cold rolling, and then used as a steel material for hot forming.

Further, the hot rolled steel material may be cold rolled, subjected to hot dip aluminum plating, and then used as a steel material for hot forming. At this time, in the present invention, during cold rolling, a cold reduction ratio may preferably be 30% to 80% but is not limited thereto. If the cold reduction ratio is less than 30%, there may be a problem that the hot rolled steel material should be thinner to secure a certain cold rolling thickness and also there may be a problem in cold rolling treading. On the contrary, if the ratio is greater than 80%, there may be problems that cracks may be easily formed at edges of the steel material, and a cold rolling load may be increased.

Then, the hot rolled steel sheet or the cold rolled steel sheet manufactured as described above is subjected to a certain annealing process, and then immersed in an aluminum plating bath to manufacture a hot dip aluminum plated steel sheet. At this time, the present invention is not limited to the annealing condition mentioned above, but it is preferable to manage the annealing temperature within a range of 700° C. to 900° C. Further, the present invention is not limited to the above hot dip aluminum plating conditions, and the aluminum plating bath may contain Al as a major ingredient and Si in a range of 7% to 12%.

In the present invention, the hot dip aluminum plated steel sheet is heated to an austenite single phase temperature range of 850° C. to 1000° C. and then maintained for 1 second to 1000 seconds. If the single phase heating temperature is lower than 850° C., ferrite is formed on the steel sheet while transferring the sheet to a mold after heating thereof in a heating furnace thereby cannot secure certain strength of the final formed part manufactured after the heating. However, if the temperature is higher than 1000° C., manufacturing costs may rise and also weldability may become worse. And it is more preferable to maintain the heating rate of 1° C./s to 100° C./s during the heating.

Further, after the heating, it is preferable to maintain the temperature for 1 second to 1000 seconds. The reason is that if the maintaining time is shorter than 1 second, it may be difficult to make enough austenite, and if the time is longer than 1000 seconds, weldability of the formed parte manufactured after the heating may be deteriorated.

Then, in the present invention, a ultra-strong HPF part having excellent bending properties and tensile strength of 1300 MPa or greater can be manufactured by hot forming the heated steel sheet with a mold and cooling thereof to 200° C. or lower at cooling speed of 20° C./s to 1000° C./s at the same time. If the cooling speed is slower than 20° C./s, it may be difficult to secure a certain strength due to bainite formation, and if the speed is faster than 1000° C./s, the strengthening effect may be saturated and also an excessive manufacturing cost may be required.

In the HPF part manufactured by the manufacturing process as mentioned above, a ferrite phase is continuously or discontinuously formed on the surface of the base steel sheet to a thickness of 50 μm or thinner, and a percentage of a ferrite phase in the surface is 5% or less. Further, carbide particles having a size of 1 μm or smaller are dispersively distributed in the surface of the base steel sheet so as to occupy 90% or greater in overall carbide particle distribution. Thus, the HPF part having excellent bending properties can be provided.

Hereinafter, the present disclosure will be described in greater detail with reference to examples. However, the following examples are for illustrative purposes only, and should not be seen as limiting the scope of the present disclosure. The scope of the present disclosure should be determined by the claims and information reasonably inferable therefrom.

EXAMPLE

TABLE 1

| Chemical ingredient (wt %) | | | | | | | | | | |
|---|---|---|---|---|---|---|---|---|---|---|
| C | Si | Mn | P | S | Al | Ti | Cr | B | N | Note |
| 0.22 | 0.3 | 1.2 | 0.014 | 0.002 | 0.03 | 0.03 | 0.2 | 0.0023 | 0.004 | Inventive Steel |

A steel slab composed as shown in the above Table 1 was subjected to vacuum melting, heated at a reheating temperature of 1200° C. for 1 hour and then hot rolled. At this time, a hot rolled steel sheet was manufactured in the conditions of the finishing hot rolling temperature of 900° C., and coiling temperature (CT) and time as shown in the following Table 2. The manufactured hot rolled steel sheet was pickled and then cold rolled at cold reduction ratio of 50% to manufacture a cold rolled steel sheet having final thickness of 1.5 mm.

The cold rolled steel sheet was annealed at 780° C., and then hot dip aluminum plated. At this time, a hot dip aluminum plating bath was composed of aluminum as a major ingredient, 8.5% Si, 2% Fe and other impurities. Using the steel sheet hot dip aluminum plated as described above, heating for mimicking hot forming was conducted. Namely, the plated steel sheet was inserted into a heating furnace, heated to 930° C., transferred to a mold after 6 min, and then quenched in the mold.

For the steel sheets manufactured as described above, whether a ferrite phase exists in the surface of a base steel sheet or not and percentage thereof, whether Si and Mn oxides exist or not, carbide particle percentage on the surface, and the like were measured. The results were shown in the following Table 2. Further, mechanical properties of the formed parts manufactured as described above were measured, and the results are shown in the following Table 3.

On the other hand, in this experiment, whether the ferrite is formed on the surface of the base steel sheet directly under the hot dip aluminum plating layer or not and percentage thereof were observed at least three regions using an optical microscope and then decided by image analysis. Further, whether the Si and Mn oxides, which can exist on the ferrite grain boundary, exist or not was analyzed using SEM, and in order to analyze the carbide particle distribution on the surface of the base steel sheet, replica was extracted directly under the surface, and size and number thereof were measured using TEM and EPMA.

Moreover, for the steel sheets manufactured as described above, mechanical properties were measured using a JIS Z 2201 No. 5 tension test specimen. As bending properties, bending angle at maximum load was measured according to VDA 238-xxx test method, and when bending test was conducted in a condition that a flexure line is perpendicular to a rolling direction, bending angle of less than 60° was decided as a failure, and bending angle of 60° or greater was determined to be a pass.

TABLE 2

| | Hot rolling conditions | | Surface structure after heating | | | | | |
|---|---|---|---|---|---|---|---|---|
| Manufacturing Conditions | CT (° C.) | S* | Whether ferrite exists within 50 μm of surface | Ferrite percentage (%) | Whether Si/Mn oxide exists or not | 1 μm carbide particle percentage (%) | 1 μm to 10 μm carbide particle number | Remarks |
| A | 480 | 220,800 | ○ | 0.5 | x | 99 | 1 | Example 1 |
| B | 600 | 230,000 | ○ | 2.1 | x | 98 | 1 | Example 2 |
| C | 600 | 246,000 | ○ | 3.2 | x | 97 | 2 | Example 3 |
| D | 700 | 302,000 | ○ | 4.5 | x | 95 | 3 | Example 4 |
| E | 400 | 184,000 | x | 0 | x | 100 | 0 | Comparative Example 1 |
| F | 780 | 360,000 | ○ | 7.2 | ○ | 83 | 10 | Comparative Example 2 |

*In Table 2, S* refers to [coiling temperature(CT) × Time(min)]/2, i.e., a time taken to reach 200° C. from coiling temperature

TABLE 3

| | Mechanical property | | | Bending properties | | |
|---|---|---|---|---|---|---|
| Condition | YS (MPa) | TS (MPa) | El (%) | Angle | Pass/Fail | Note |
| A | 1121 | 1536 | 6.5 | 63.5 | Pass | Example 1 |
| B | 1107 | 1518 | 6.6 | 64.6 | Pass | Example 2 |
| C | 1102 | 1508 | 6.4 | 65.2 | Pass | Example 3 |
| D | 1096 | 1487 | 6.9 | 67.8 | Pass | Example 4 |
| E | 1133 | 1538 | 6.2 | 58.1 | Fail | Comparative Example 1 |
| F | 1047 | 1465 | 6.7 | 55.8 | Fail | Comparative Example 2 |

As shown in the above Tables 1 to 3, in Examples 1 to 4 whose manufacturing process as well as steel composition is within a range of the present invention, it can be found that the ferrite phase exists on the surface of the base steel sheet, and percentage thereof is 5% or less. Further, the Si and/or Mn oxides did not exist on the surface mentioned above, and coarse carbide particles of 1 μm to 10 μm wherein percentage of the carbide particle having a size of 1 μm or less is 90% or greater did not exist thereby securing a certain bending properties. This can be confirmed through images of FIGS. 2 and 3, and in the above Figures, Example refers to Example 1 in Tables 2 and 3.

Figure 2:
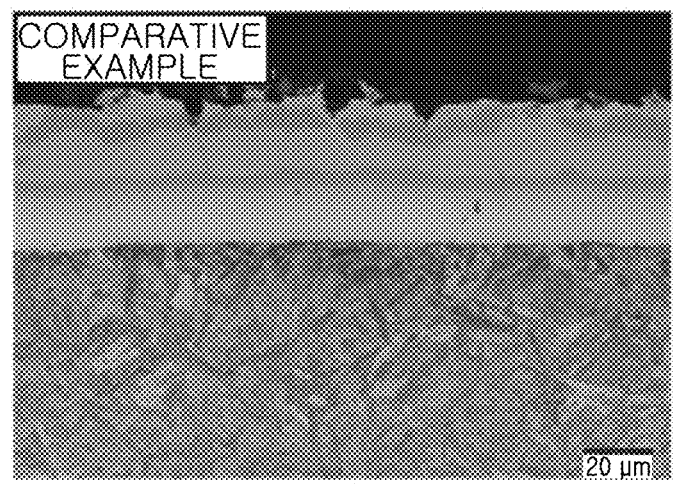
FIG. 2 is a structure image showing a microstructure of the surface of a base steel sheet directly under a plating layer after preheating treatment according to an embodiment of the present invention in comparison with Comparative Example.
Figure 2:
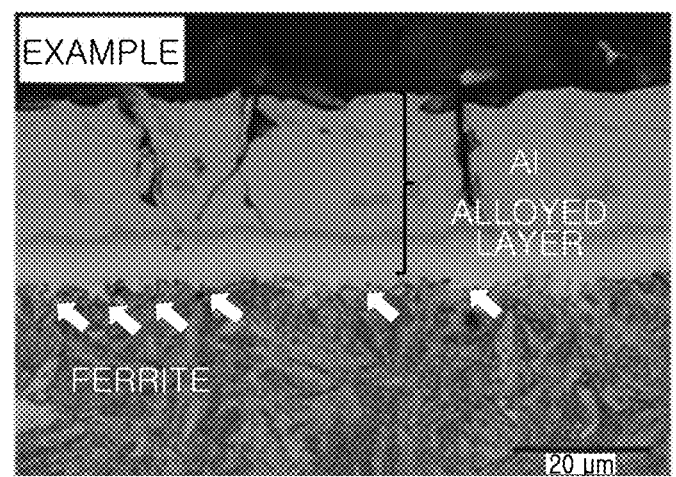
Figure 3:
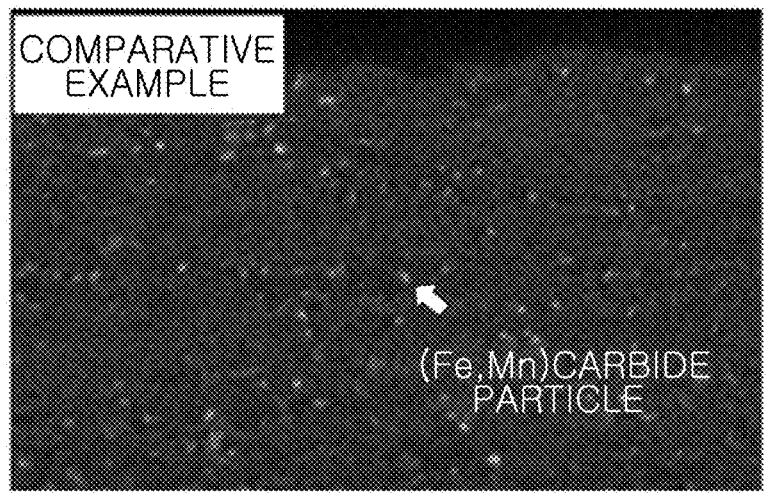
FIG. 3 is an image showing Mn distribution (EPMA) of the surface of a base steel sheet directly under a plating layer after preheating treatment according to an embodiment of the present invention in comparison with Comparative Example.
Figure 3:
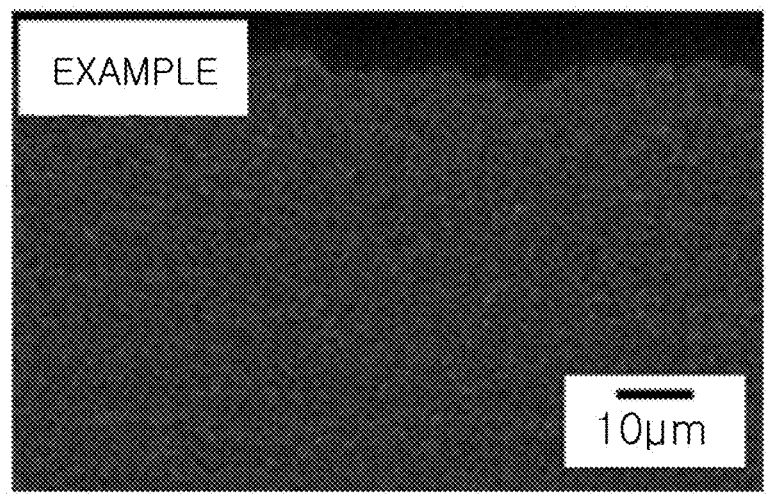

On the contrary, in the case of Comparative Example 1, it can be found that enough ferrite was not formed on the surface of the base steel sheet due to too small (coiling temperature×Time)/2, thereby a certain bending angle cannot be secured. On the other hand, in FIGS. 2 and 3, Comparative Example refers to Comparative Example 1 in Tables 2 and 3.

Figure 4:
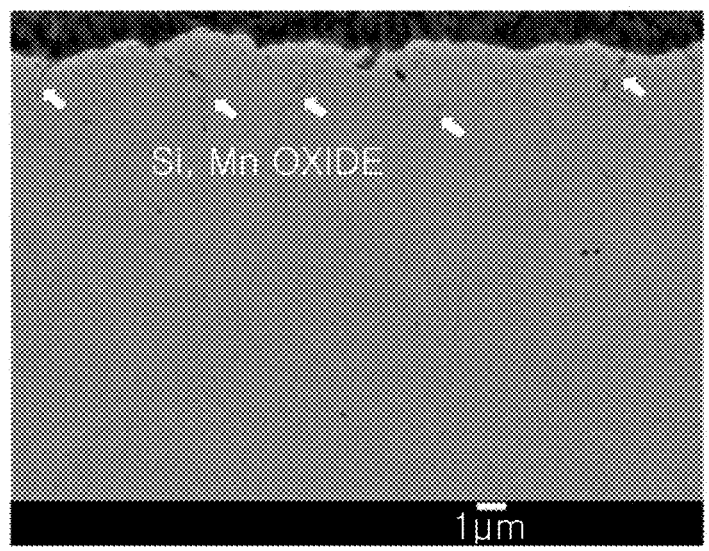
FIG. 4 is a structure image of the hot rolled surface layer of a steel sheet of Comparative Example.

Further, in Comparative Example 2, it can be found that enough ferrite was formed on the surface of the base steel sheet, but the Si and/or Mn oxides existed in the form of a ban on the ferrite grain boundary and a lot of coarse carbide particles were formed, thereby the bending angle was further worse. FIG. 4 is a structural image in Comparative Example 2.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed are:

1. An HPF part, the HPF part comprising:
   a base steel sheet; and
   a hot dip aluminum plating layer formed on a surface of the base steel sheet,
   wherein the base steel sheet comprises C: 0.18% to 0.25%, Si: 0.1% to 0.5%, Mn: 0.9% to 1.5%, P: 0.03% or less, S: 0.01% or less, Al: 0.01% to 0.05%, Cr: 0.05% to 0.5%, Ti: 0.01% to 0.05%, B: 0.001% to 0.005%, N: 0.0069% or less, a balance of Fe and other impurities by wt %;
   a ferrite phase is continuously or discontinuously formed in a surface layer of the base steel sheet under the hot dip aluminum plating layer, the ferrite phase having a thickness of 50 μm or thinner and a percentage of the ferrite phase in the surface being 5% or less; and
   carbide particles having a size of 1 μm or smaller are dispersively distributed in the surface layer of the base steel sheet so as to occupy 90% or greater in overall carbide particle distribution.

2. The HPF part of claim 1, wherein an amount of carbide particles in a size range of 1 μm to 10 μm is 5 or less per 10 $mm^2$ in the surface layer.

3. The HPF part of claim 1, wherein the base steel sheet is any one of a cold rolled steel sheet and a hot rolled steel sheet.

4. The HPF part of claim 1, wherein the base steel sheet further comprises Mo+W: 0.001% to 0.5%.

5. The HPF part of claim 1, wherein the base steel sheet further comprises at least one of Nb, Zr and V: within a range of 0.001% to 0.4%.

6. The HPF part of claim 1, wherein the base steel sheet further comprises Cu+Ni: within a range of 0.005% to 2.0%.

7. The HPF part of claim 1, wherein the base steel sheet further comprises at least one of Sb, Sn and Bi: 0.03% or less.

* * * * *